(12) United States Patent
Sassara et al.

(10) Patent No.: US 11,922,069 B2
(45) Date of Patent: Mar. 5, 2024

(54) ADAPTIVE BLOCK MAPPING

(71) Applicant: Micron Technology, Inc., Boise, ID (US)

(72) Inventors: Alberto Sassara, Naples (IT); Giuseppe D'Eliseo, Caserta (IT); Lalla Fatima Drissi, Ottaviano (IT); Luigi Esposito, Piano di Sorrento (IT); Paolo Papa, Naples (IT); Salvatore Del Prete, Grumo Nevano (IT); Xiangang Luo, Fremont, CA (US); Xiaolai Zhu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/750,131

(22) Filed: May 20, 2022

(65) Prior Publication Data
US 2023/0376245 A1    Nov. 23, 2023

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ....... G06F 3/061; G06F 3/0659; G06F 3/0679
See application file for complete search history.

(56) References Cited

U.S. PATENT DOCUMENTS

| 8,886,877 | B1 * | 11/2014 | Avila | G06F 12/0246 711/E12.008 |
| 2014/0359382 | A1 * | 12/2014 | Choi | G06F 12/0246 714/710 |
| 2020/0356307 | A1 * | 11/2020 | Subbarao | G06F 12/0246 |

* cited by examiner

*Primary Examiner* — Larry T Mackall
(74) *Attorney, Agent, or Firm* — Holland & Hart LLP

(57) ABSTRACT

Methods, systems, and devices for adaptive block mapping are described. In some examples, a first superblock and a second superblock may be established across one or more dice of a memory device. The superblocks may each include one or more blocks from a plurality of planes of a memory die. In some examples, the second superblock may include at least one bad block (e.g., defective block) in addition to one or more good blocks (e.g., non-defective blocks). The memory device may receive a command for writing data in a first mode and may write a first subset of the data to the first superblock in the first mode, a second subset of the data to the second superblock in the first mode, and one or more blocks associated with the second superblock in a second mode. Additionally or alternatively, the memory device may receive a second command for writing data in the second mode and may write the data to the first superblock in the first mode.

22 Claims, 9 Drawing Sheets

ADAPTIVE BLOCK MAPPING

FIELD OF TECHNOLOGY

The following relates generally to one or more systems for memory and more specifically to adaptive block mapping.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
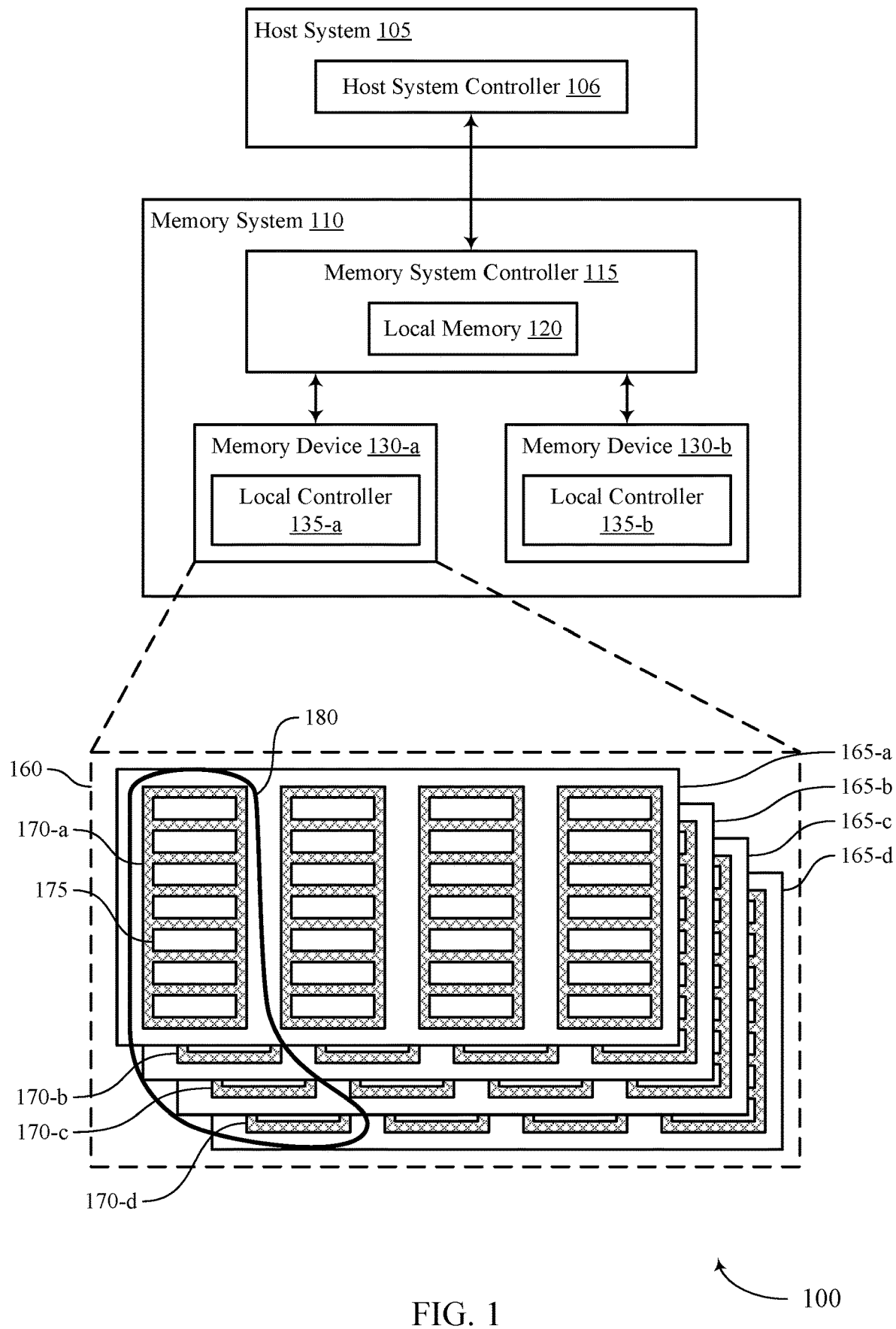
FIG. 1 illustrates an example of a system that supports adaptive block mapping in accordance with examples as disclosed herein.

A non-volatile memory device may include multiple die (e.g., multiple memory die) that each include one or more planes. Each plane may include one or more blocks, and each block may include one or more memory cells (e.g., one or more non-volatile memory cells, such as NAND memory cells). In a managed NAND (e.g., mNAND) device, the memory cells may be managed by a memory controller (e.g., that may be external to the memory die). Managed NAND (e.g., mNAND) devices may use multi-plane writes to achieve higher performance across one or more memory die. For example, a multi-plane write command may concurrently write data to memory cells across various planes of each memory die. In some examples, superblocks may be established for a managed NAND device during manufacturing. A superblock may include one or more blocks from multiple planes, which may improve performance during a multi-plane write operation.

In some instances, a superblock may include one or more bad blocks (e.g., defective blocks). Because certain operations (e.g., maintenance operations, refresh operations, etc.) assume that each superblock includes a same quantity of blocks (e.g., a same quantity of valid blocks), the memory device may incur a performance loss due to a superblock including one or more bad blocks (e.g., due to overhead in managing superblocks having different quantities of valid blocks). Thus, despite superblocks generally improving performance during multi-plane write operations, the presence of bad blocks in a superblock may lower the overall performance of a memory device.

Techniques for utilizing superblocks across multiple memory dice are described herein. In some examples, a controller (e.g., a mNAND controller) may be configured to generate and maintain various superblocks on one or more memory die. For example, a controller may generate or maintain first superblocks (e.g., complete superblocks, main superblocks) that include good blocks (e.g., non-defective blocks) in each of a plurality of planes and second superblocks (e.g., incomplete superblocks, shadow superblocks) that include one or more bad blocks (e.g., defective blocks), or for which good blocks are not available in each plane. In some instances, a shadow superblock may be associated with a main superblock and may be used when a memory device operates in a first mode (e.g., a multiple-level cell mode). For example, a memory device operating in a multiple-level cell mode may write a plurality of bits of data to each memory cell, whereas a memory device operating in a second mode (e.g., single-level cell (SLC) mode) may write a single bit of data to each memory cell. In some cases, SLC writes may have less latency than multiple-level cell writes.

In a first example, a memory device may receive a command (or a set of commands) for writing data to one or more blocks in the first mode. A first subset of the data may be written to the main superblock in the first mode and a second subset of the data may be written to a first portion of the shadow superblock in the first mode. The first portion of the shadow superblock may include good blocks of the superblock from a subset of planes. Because the shadow superblock may include one or more bad blocks or planes for which a good block is unavailable, a third portion of the data may be written to one or more blocks that are associated with the shadow superblock in the second mode. By associating the shadow superblock with the main superblock, data may be written to both superblocks with only an additional write in the second mode. That is, the additional latency for the write in the second mode may be spread across at least two writes in the first mode, which may have a relatively minor impact on overall latency. Thus, a superblock that would otherwise be incomplete may be accessed as a complete superblock and may improve the performance of the associated memory device by the availability of more complete superblocks. Moreover, by associating additional blocks with the shadow superblock for use in a single-level mode, data may be written to the additional blocks faster than it would be written to a single block in the multiple-level cell mode. Accordingly, utilizing a main superblock, a shadow superblock, and additional SLC blocks associated with the shadow superblock may improve the overall performance of the memory device.

In another example, the memory device may receive a command (or a set of commands) for writing data to one or more blocks in the second mode. In such examples, the memory device may not utilize the shadow superblock when operating in the second mode because, when performing a SLC write, a same time savings may not be realized by replacing bad blocks with multiple blocks written in an single-level mode (e.g., a SLC mode). Instead, the memory device may ignore or skip a superblock that includes a bad block. Accordingly, the memory device described may utilize complete superblocks (e.g., superblocks with good blocks across all planes) while operating in a single-level mode and refrain from using superblocks that are not complete (e.g., do not have good blocks available in each plane), while maintaining the superblocks that are not complete as shadow superblocks for use when operating in a multiple-level cell mode, which may improve the overall performance of the memory device.

Features of the disclosure are initially described in the context of systems as described with reference to FIGS. 1 through 2. Features of the disclosure are described in the context of memory devices and a process flow diagram as described with reference to FIGS. 3-5. These and other features of the disclosure are further illustrated by and described with reference to an apparatus diagram and flowcharts that relate to adaptive block mapping as described with reference to FIGS. 6-9.

FIG. 1 illustrates an example of a system 100 that supports adaptive block mapping in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single-level cells. Additionally or alternatively, a NAND memory device 130 may include memory cells configured to each store multiple bits of information, which may be referred to as multi-level cells (MLCs) or double-level cells (DLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry. In some cases, a memory cell may be used as a single-level cell or a multiple-level cell (e.g., may be used in a variety of modes including SLC, MLC, TLC, or QLC write modes at different times).

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support adaptive block mapping. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system. For example, the memory system controller 115 may maintain one or more superblocks associated with the memory die 160. As described herein, a superblock may include at least one block 170 from two or more planes of the memory die 160. In some examples, a first superblock may include a good blocks (e.g., non-defective blocks) from each of a set of planes and a second superblock may include good blocks from each of the subset of a set of planes, and one or more bad blocks (e.g., defective blocks). An additional set of blocks from respective planes may replace the one or more bad blocks in the second superblock.

The memory system controller 115 may receive a command for writing data to the memory die 160. In some examples, the memory system controller 115 may receive a command for writing data to the memory die 160 in a first mode (e.g., in a multi-level mode). The command may include data and one or more logical addresses. The memory system controller 115 may manage one or more cursors to track physical addresses of the memory die 160 that data is written to. In some examples, the physical addresses of the memory die 160 may be associated with a first superblock and a second superblock.

The memory system controller 115 may write a first portion of the data to the first superblock and a second portion of the data to the second superblock in the multi-level mode. In some instances, the memory system controller 115 may identify one or more blocks, that are associated with the second superblock, to write a third portion of the data to in a second mode (e.g., a single-level mode). For example, the data may be written to the one or more blocks based on at least one block included in the second superblock being bad (e.g., defective). Writing data to the one or more blocks associated with the second superblock in the single-level mode may improve the overall performance of the memory system 110.

In another example, the memory system controller 115 may receive a command for writing data to the memory die 160 in the single-level mode. The memory system controller 115 may write the data to the first superblock and may refrain from writing data to the second superblock based on receiving the command. Accordingly, memory system 110 may utilize a compete superblock (e.g., a first superblock) while operating in a single-level mode, while maintaining one or more second superblocks for use when operating in a multi-level cell mode, which may improve the overall performance of the memory system 110.

Figure 2:
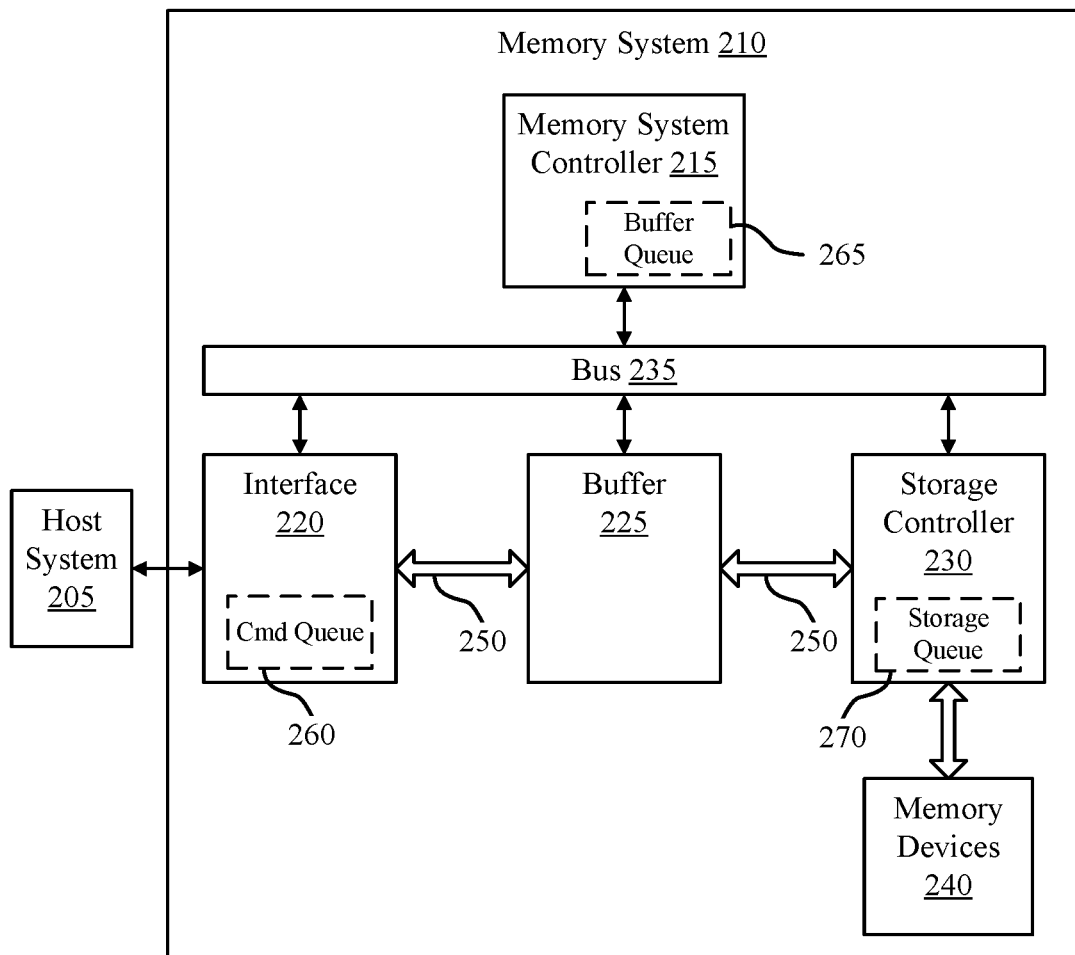
FIG. 2 illustrates an example of a system that supports adaptive block mapping in accordance with examples as disclosed herein.

FIG. 2 illustrates an example of a system 200 that supports adaptive block mapping in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved there-from, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 may maintain one or more superblocks associated with the memory devices 240. As described herein, a superblock may include at least one block from two or more planes of a memory device 240. When the memory system 210 (or the memory devices 240) are fabricated, a testing process may be performed on the memory devices 240 to identify bad blocks. Upon identifying the bad blocks, superblocks (e.g., sets of blocks across each plane, which may or may not have a same block address) may be created. In some instances, superblocks having one or more bad blocks may be paired with superblocks having all good blocks as described herein. In some examples, a first superblock may include a set of good blocks across each plane (e.g., non-defective blocks) and a second superblock may include one or more bad blocks (e.g., defective blocks). Additionally or alternatively, blocks (e.g., a set of blocks) from other planes may be associated with the superblock having one or more bad blocks.

The memory system controller 215 may receive a command for writing data to one or more of the memory devices 240. In some examples, the memory system controller 215 may receive a command for writing data to the one or more memory devices 240 in a first mode (e.g., in a multi-level mode). The command may include data and one or more logical addresses. The memory system controller 215 may manage one or more cursors to track physical addresses of the memory devices 240 that data is written to. In some examples, the physical addresses of the memory devices 240 may be associated with a first superblock and a second superblock.

Upon receiving a command (or commands), the memory system controller 215 may write a first portion of the data to the first superblock and a second portion of the data to the second superblock in the multi-level mode. In some instances, the memory system controller 215 may identify one or more blocks, that are associated with the second superblock, to write a third portion of the data to in a second mode (e.g., a single-level mode). For example, the data may be written to the one or more blocks based on at least one block included in the second superblock being bad (e.g., defective). Writing data to the one or more blocks associated with the second superblock in the single-level mode may improve the overall performance of the memory system 210.

In another example, the memory system controller 215 may receive a command for writing data to a memory device 240 in the single-level mode. The memory system controller 215 may write the data to the first superblock and may refrain from writing data to the second superblock based on receiving the command. Accordingly, memory system 210 may utilize a compete superblock (e.g., a first superblock) while operating in a single-level mode, while maintaining one or more second superblocks for use when operating in a multi-level mode, which may improve the overall performance of the memory system 210.

Figure 3:
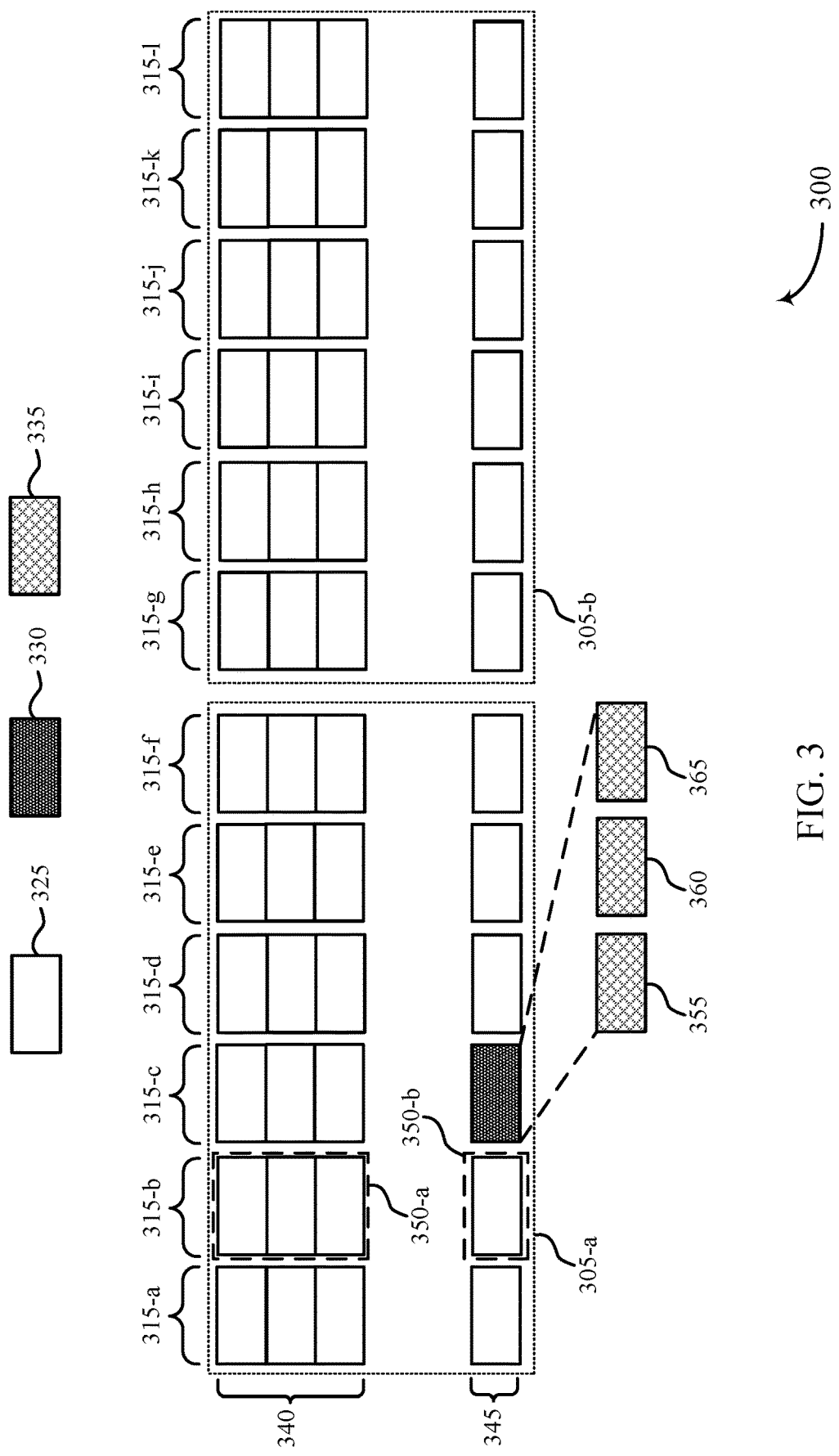
FIG. 3 illustrates an example of a memory device that supports adaptive block mapping in accordance with examples as disclosed herein.

FIG. 3 illustrates an example of a memory device 300 that supports adaptive block mapping in accordance with examples as disclosed herein. The memory device 300 may include multiple memory die 305 (e.g., a first memory die 305-a and a second memory die 305-b). In some examples, the memory die 305 and the memory die 310 may each include one or more planes 315 that each include one or more blocks. Moreover, each block 350 of the memory device 300 that is illustrated in FIG. 3 may be associated with or included in a superblock. For example, a first subset of blocks 350 of the memory device 300 may be included in a first superblock 340 (e.g., a main superblock 340) and a second subset of blocks 350 of the memory device 300 may be included in a second superblock 345 (e.g., a shadow superblock). As described herein, the memory device 300 (e.g., a controller of the memory device 300) may maintain one or more cursors to indicate the current write location for writing in a first mode (e.g., a multi-level mode) and a second mode (e.g., a single-level mode). For example, the memory device 300 may maintain a first cursor for writing in the first mode and a second cursor for writing in the second mode.

As shown in FIG. 3, the memory device 300 may include a first memory die 305 that includes planes 315-a through planes 315-f Although six (6) planes are illustrated, the first memory die 305 may include any quantity of planes. Each plane 315 of the first memory die 305 may include a plurality of blocks 350. For simplicity, each plane is illustrated as including two (2) blocks 350, and each block 350 is associated with (e.g., included in) a respective superblock. Although two (2) blocks 350 are illustrated, the first memory die 305 may include any quantity of blocks including tens, hundreds, or thousands of blocks 350. Each block 350 may include one or more pages (e.g., one or more pages of data), and may be configured to store a quantity of data, such as 16 KB of data.

In some examples, the memory device 300 may include good blocks 325 (e.g., blocks that are not defective) and bad blocks 330 (e.g., defective blocks). As described with reference to FIG. 3, upon receiving a command (e.g., a write command) data may be written to the good blocks 325. In some examples, data may be written to the good blocks 325 as part of a multi-level write operation, where multiple bits of data may be written to the memory cells included in the respective good blocks 325, or as part of a single-level write operation, where a single bit of data may be written to the cells included in the respective good blocks 325. In some instances, data may not be written to the bad blocks 330 during a multi-level write operation, but may instead be written to one or more additional blocks 335 in an SLC write mode (e.g., written to one or more blocks 335 as a single-level write), which may improve the overall performance of the memory device 300.

As described with reference to FIG. 3, each plane 315 may include any quantity of pages. For example, each plane may include one or more pages (e.g., one or more pages of data), and may be configured to store a quantity of data, such as 16 KB of data. Thus, as shown in FIG. 3 and for exemplary purposes only, for two memory die each with six planes, each superblock may hold thirty-six (36) blocks 350 of data in a multi-level mode (e.g., TLC write mode). Data may be written to the blocks 350 in one or more modes. For example, while operating in a first mode (e.g., a multi-level mode), multiple bits of data may be written to each good block 325 and while operating in a second mode (e.g., a single-level mode), one bit of data may be written to each good block 325 or to one or more SLC blocks 335.

As described herein, the defective blocks 330 may be identified during a testing process and thus data may not be written to the defective blocks during a multi-level operation (e.g., when operating in a first mode). The memory device 300 may write the data to the good blocks 325 of the first superblock 340 and the good blocks 325 of the second superblock 345. That is, although FIG. 3 does not illustrate three blocks 350 of data being written to the second superblock 345 in the multi-level mode, the good blocks 325 of the second superblock 345 have a same quantity of blocks of data written to them as the first superblock 340.

Instead of writing data to the bad blocks 330 of the second superblock 345, the extra data (e.g., the data that would have been written to the bad blocks 330 but for the blocks being defective) may be written in an SLC mode to one or more additional blocks 335 (e.g., block 355, block 360, block 365). In some cases, the one or more additional blocks 335 may be located in different planes than the bad blocks 330. Moreover, the memory device 300 may write the data to the additional blocks 335 in a second mode (e.g., a single-level mode), which may be performed relatively faster than a multi-level write. By writing data to one or more additional blocks 335 in a second mode when the memory device 300 receives a command for writing data in a first mode, the overall performance of the memory device 300 may be increased.

In some examples, superblocks may be established for the memory device 300 during manufacturing. A superblock may refer to a logical grouping of blocks 350, managed by firmware (e.g., firmware of a memory controller), in one or more memory dice. For example, a superblock may include at least one block 350 from at least two planes 315 from the planes 315 included in the memory die 305, the memory die 310, or both. In other examples, a superblock may include at least one block 350 from each plane 315 included in the memory die 305, the memory die 310, or both. Thus when data is received from a host device (e.g., data associated with a write), the memory controller may write the data to the blocks 350 included in the superblock concurrently (e.g., using a multi-plane write) according to one or more cursors.

During manufacturing of the memory device 300, testing operations may be performed to identify one or more bad blocks 330. Based on the identification of one or more bad blocks 330, at least two types of superblocks may be established. The superblocks may be established during the testing operation(s) or, in some examples, may be established and maintained by a memory controller during operation. In some examples, a first superblock (e.g., main superblock, a complete superblock, a first set of blocks), such as the superblock 340, may be established. A main superblock 340 may refer to a superblock where each block 350 in each plane (e.g., each plane 315) is a good block 325. Because the main superblock 340 does not include any bad blocks 330, the memory device 300 may not incur a drop in performance that may otherwise occur due to the superblock 340 including one or more bad blocks 330. Accordingly, when the memory device 300 receives a command (e.g., a write command) for writing data to one or more blocks 350 of the main superblock 340, the data may be written to the blocks 350 without any degradation in performance of the memory device 300. Moreover, writes to pages within the superblock 340 may incur only a single write duration (e.g., a multi-level cell write duration for a multi-level cell write command).

Additionally or alternatively, a second superblock (e.g., a shadow superblock that includes an incomplete superblock (ICS) and a second set of blocks), such as the superblock 345, may be established. A shadow superblock 345 may refer to a superblock having at least one plane 315 that includes a bad block 330. As described herein, a shadow superblock 345 may be associated with (e.g., paired with) a complete superblock 340 to improve performance of the memory device 300 while operating in a first mode (e.g., a multi-level mode). For example, if multiple superblocks having at least one bad block 330 are adjacent to each other, the memory device 300 may perform consecutive SLC writes on additional blocks 335 for consecutive multi-level writes which may result in performance dips due to the SLC writes. However, by interspersing SLC writes to the additional blocks 335 with multi-level writes to the first superblock 340 and the second superblock 345, the memory device 300 may maintain a higher average performance rate over all write operations, thus improving the overall performance of the memory device 300.

Moreover, because a shadow superblock 345 may include fewer good blocks 325 (e.g., fewer valid pages) than a complete superblock 340, the memory device 300 may ordinarily experience a degradation in performance when performing certain operations. For example, some operations such as garbage collection and refresh operations assume that a superblock includes a same number of good blocks 325 (e.g., valid pages). Because shadow superblock 345 includes one or more bad blocks 330, the memory device 300 may experience an overprovisioning or performance loss due to such operations being performed. However, by associating one or more additional blocks 335 with the shadow superblock 345, data may be written to the additional blocks 335 instead of the bad block 330. Because SLC write operations may be performed relatively faster than multi-level write operations, the memory device 300 may not experience a significant performance drop by writing the data in the SLC mode to the additional blocks 335. Accordingly, utilizing a main superblock 340, a shadow superblock 345, and one or more additional blocks 335 associated with the shadow superblock 345 may improve the overall performance of the memory device 300.

By way of example, a testing operation may have been performed on the memory device 300 during manufacturing. The testing operation may have identified one or more bad blocks 330, such as a block (or blocks) located in plane 315-c of the memory die 305. Accordingly, a memory controller (e.g., firmware of the memory controller) associated with the memory device may establish and manage a first superblock 340 that includes all good blocks 325, and a second superblock 345 that includes the bad block 330 in plane 315-c (or additional bad blocks 330). Moreover, the memory controller may maintain one or more cursors that indicate the current write location for multi-level and SLC writes. For example, the memory controller may maintain a first cursor that indicates that the current write location for a multi-level write is a first block included in plane 315-a of the first superblock 340. A write operation may be performed on the first superblock 340 (e.g., starting at the first block in plane 315-a), followed by a write operation performed on the second superblock 345.

During operation (e.g., after testing), the memory device 300 may receive one or more commands from a host system (e.g., a host system 105 as described with reference to FIG. 1) for writing data in a first mode (e.g., in a multi-level mode). For example, the command(s) may indicate a multi-plane write operation to be performed on the memory die 305 and the memory die 310. A first portion of the data may be written to the first superblock 340 starting at a block 350 indicated by the first cursor. In some instances, because the first superblock 340 includes all good blocks 325, the at least two bits of data may be written to at least one memory cell of each page of each block 350 of the first superblock 340.

After writing the first portion of the data to the first superblock 340, a second portion of data may be written to a portion (e.g., a first subset) of the second superblock 345. In some instances, the second portion of the data may be written to one or more good blocks 325 of the second superblock 345 (e.g., one or more good blocks of the incomplete portion of the second superblock 345). The multi-plane write used to write the first subset of data on the incomplete portion of the second superblock 345 may skip planes with the bad block(s) 330.

A third portion of the data may instead be written to one or more additional blocks 335, such as the blocks 355, 360, and 365, which may collectively be referred to as a second subset of the second set of blocks. In some instances, the third portion of the data may be written, starting at block 355, in a single multi-plane SLC write operation. As described herein, the blocks 355, 360, and 365 may be located in a different plane (or different planes) than the bad block(s) 330. For example, the bad block(s) 330 may be located in plane 315-c, thus the blocks 355, 360, and 365 may be located in planes other than plane 315-c (e.g., planes 315-d, 315-e, and 315-f). Thus the third portion of the data may be written to the additional blocks 335 in a second mode (e.g., in a SLC mode). Because data may be written in a single-level mode relatively faster than in a multi-level mode, the memory device may not incur a substantial performance drop by writing the third portion of the data to the additional blocks 335. Moreover, by utilizing a main superblock 340 and a shadow superblock 345, the overall performance of the memory device 300 may be improved as describe herein.

Figure 4:
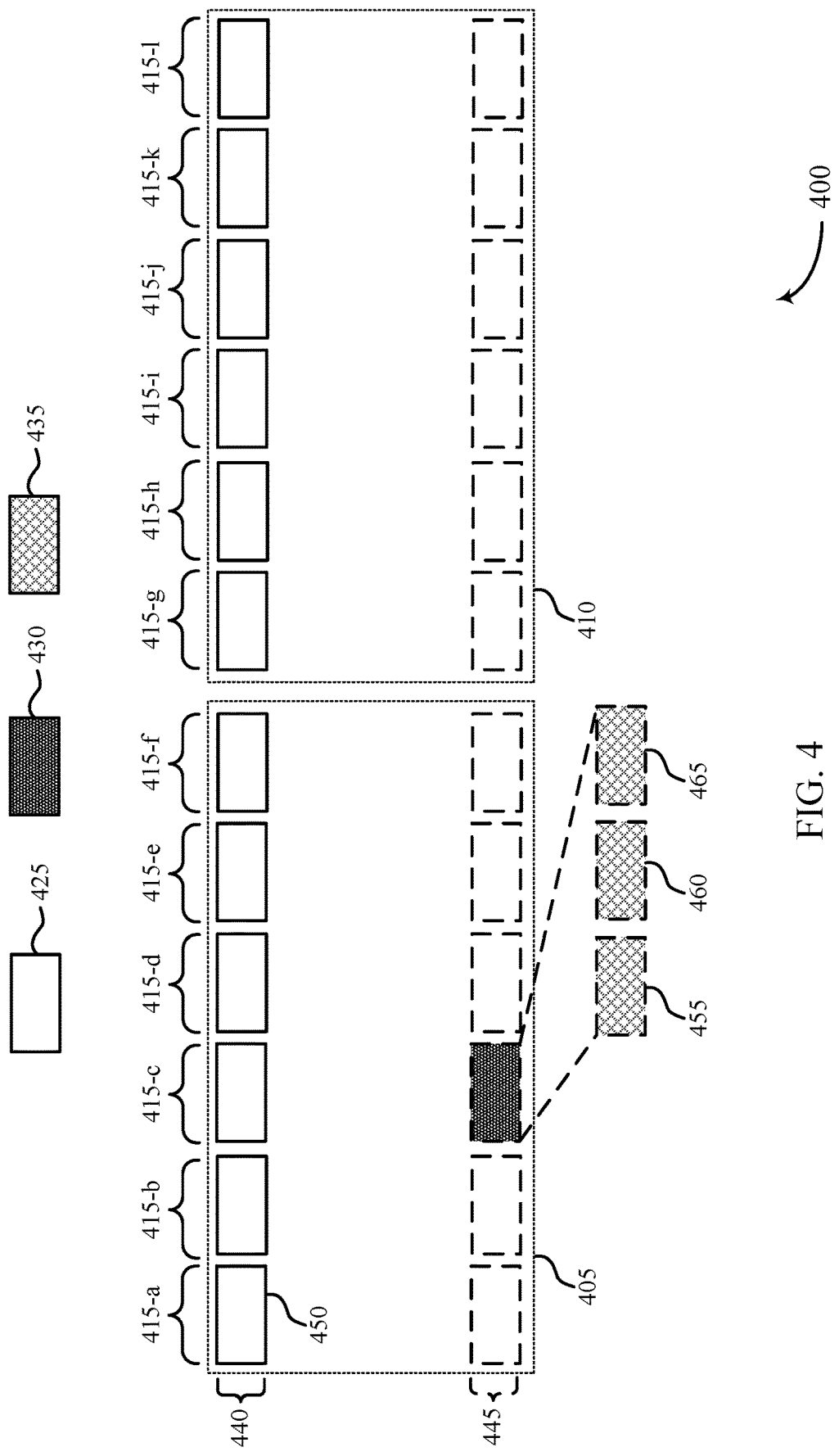
FIG. 4 illustrates an example of a memory device that supports adaptive block mapping in accordance with examples as disclosed herein.

FIG. 4 illustrates an example of a memory device 400 that supports adaptive block mapping in accordance with examples as disclosed herein. The memory device 400 may be an example of the memory device 300 as described with reference to FIG. 3, but receives one or more commands for writing data in a second mode (e.g., a SLC mode) as opposed to a first mode (e.g., a multi-level mode). Accordingly, the memory device 400 may include memory die 405 (e.g., a first memory die 405) and memory die 410 (e.g., a second memory die 310). In some examples, the memory die 405 may include one or more planes 415 that each include one or more blocks, and the memory die 410 may include one or more planes 420 that each include one or more blocks. As described herein, the memory device 400 (e.g., a controller of the memory device 400) may maintain one or more cursors to indicate the current write location for writing in a first mode (e.g., a multi-level mode) and a second mode (e.g., a SLC mode).

In some examples, the memory device 400 may include good blocks 425 (e.g., blocks that are not defective) and bad blocks 430 (e.g., defective blocks). As described with reference to FIG. 4, the good blocks 425 may be associated with SLC write operations, where a single bit of data may be written to the memory cells included in the respective blocks 450. In some instances, the memory device 400 may maintain a cursor (e.g., a second cursor) that effectively skips a superblock that includes one or more bad blocks 430. That is, when writing data in a second mode (e.g., a SLC mode), the cursor may select superblocks having all good blocks 425 and the memory device 400 may effectively refrain from writing data to the shadow superblock structure as described with reference to FIG. 3. Instead, the shadow superblock structure may be effectively hidden due to the cursor being incremented for each superblock, and thus the memory device 400 may select a complete superblock 440 for writing the data to.

In some examples, superblocks may be established for the memory device 400 during manufacturing. A superblock may refer to a logical grouping of blocks 450, managed by firmware (e.g., firmware of a memory controller), in one or more memory dice. For example, a superblock may include at least one block 450 from at least two planes from the planes included in the memory die 405, the memory die 410, or both. Thus when data is received from a host device (e.g., data associated with a write), the memory controller may write the data to the blocks 450 included in the superblock concurrently (e.g., using a multi-plane write) according to one or more cursors.

During manufacturing of the memory device 400, testing operations may be performed to identify one or more bad blocks 430. Based on the identification of one or more bad blocks 430, at least two types of superblocks may be established. In some examples, a first superblock (e.g., main superblock, a complete superblock, a first set of blocks), such as the superblock 440, may be established. A main superblock 440 may refer to a superblock where each block 450 in each plane (e.g., each plane 415) is a good block 425. Accordingly, when the memory device 400 receives a command (e.g., a write command) for writing data to one or more blocks 450 of the main superblock 440, the data may be written to the blocks 450 without any degradation in performance of the memory device 400.

Additionally or alternatively, a second superblock (e.g., a shadow superblock, an incomplete superblock (ICS), a second set of blocks), such as the superblock 445, may be established. A shadow superblock 445 may refer to a superblock having at least one plane 415 (or 420) that includes a bad block 430. As described herein, a shadow superblock 445 may be associated with (e.g., paired with) a complete superblock 440 to improve performance of the memory device 400 while operating in a first mode (e.g., a multi-level mode).

However, the memory device 400 may not utilize the shadow superblock 445 when operating in a second mode (e.g., a SLC mode). For example, as described with reference to FIG. 3, multi-level writes may take more time than SLC writes and thus it may be beneficial to replace bad blocks 430 with SLC blocks 435 during a multi-level write because an additional SLC write does not add as significant overhead to a multi-level write as to another SLC write. However, when performing a SLC write, the same time savings may not be realized by replacing bad blocks 430 with SLC blocks 435. Instead, the memory controller may ignore or skip a superblock that includes a bad block 430. Accordingly, as described with reference to FIG. 4, the memory device 400 may skip or ignore the shadow superblock 445 while operating in a single-level mode.

By way of example, a testing operation may have been performed on the memory device 400 during manufacturing. The testing operation may have identified one or more bad blocks 430, such as a block (or blocks) located in plane 415-c of the memory die 405. Accordingly, a memory controller (e.g., firmware of the memory controller) associated with the memory device 400 may establish and manage a first superblock 440 that includes all good blocks 425, and a second superblock 445 that includes the bad block 430 (or bad blocks 430) in plane 415-c. Moreover, the memory controller may maintain one or more cursors that indicate the current write location for multi-level and SLC writes. For example, the memory controller may maintain a first cursor that indicates that the current write location for a SLC write is a first block included in plane 415-a of the first superblock 440.

During operation (e.g., after testing), the memory device 400 may receive one or more commands (e.g., second commands) from a host system (e.g., a host system 105 as described with reference to FIG. 1) for writing data in a second mode (e.g., in a SLC mode). For example, the command(s) may indicate a multi-plane write operation to be performed on the memory die 405 and the memory die 410. In some instances the data may be written to the first superblock 440 starting at a block 450. In some instances, because the first superblock 440 includes all good blocks 425, the first portion of the data may be written to each block 450 of the first superblock 440.

In some instances, if the second command includes more data to be written to the memory die 405, a second portion of data may be written to another complete superblock. That is, because the shadow superblock 445 includes one or more bad blocks 450, it may be effectively skipped or ignored to improve performance of the memory device 400. Accordingly, the memory controller may identify another (e.g., a second) complete superblock to write the second portion of data to. Additionally or alternatively, one or more blocks 450 of the first superblock 440 (or another complete superblock) may have become defective after the testing operation. In such instances, the memory controller may write the respective data to one or more blocks included in extra storage of the memory device 400, or may select a different complete superblock for writing the data to. In either instance, the memory device 400 may utilize compete superblocks while operating in a single-level mode, while maintaining one or more shadow superblocks for use when operating in a multi-level mode, which may improve the overall performance of the memory device 400.

Figure 5:
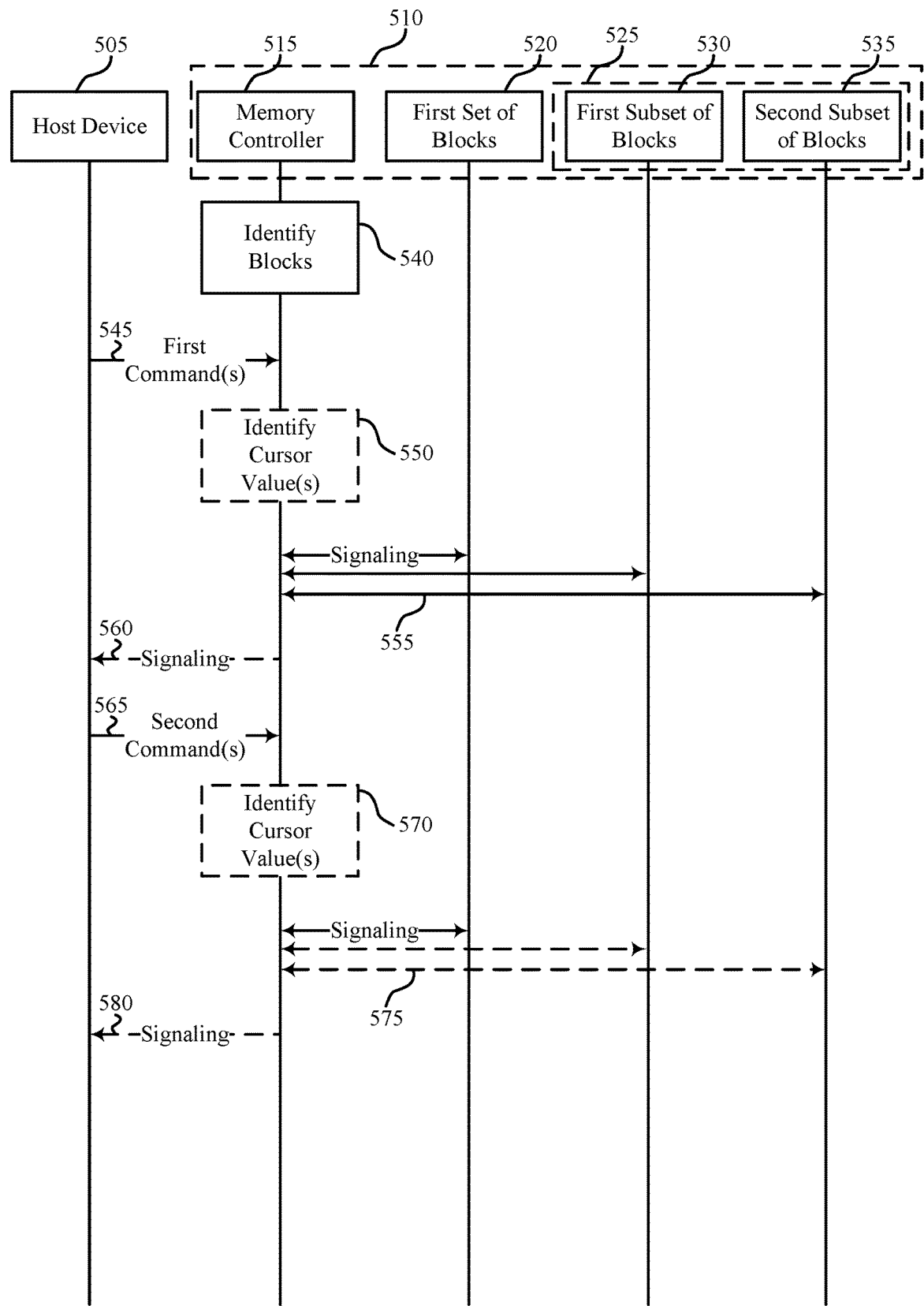
FIG. 5 illustrates an example of a process flow diagram that supports adaptive block mapping in accordance with examples as disclosed herein.

FIG. 5 illustrates an example of a process flow diagram 500 that supports adaptive block mapping in accordance with examples as disclosed herein. The process flow diagram 500 may illustrate the operations of a host device 505 and a memory device 510, which may be an example of a memory device 300 or a memory device 400 as described with reference to FIGS. 3 and 4, respectively. The memory device 510 may be an example of a managed memory device (e.g., an mNAND memory device) and may include a memory controller 515, a first set of blocks 520 and a second set of blocks 525. In some examples, the second set of blocks 525 may include a first subset of blocks 530 and a second subset of blocks 535. The first set of blocks 520 and the second set of blocks 525 may be associated with (e.g., included in) any quantity of memory dice as described with reference to FIGS. 3 and 4. The process flow diagram 500 may illustrate writing data to one or more sets of blocks in a first mode (e.g., a multi-level mode) or in a second mode (e.g., a SLC mode), which may improve the overall performance of the memory device 510.

At 540, the memory controller 515 may identify one or more blocks of the memory device 510. In some instances, the memory controller 515 may identify at least a first superblock (e.g., a first superblock 340 or a first superblock 440 as described with reference to FIGS. 3 and 4) and a second superblock (e.g., a second superblock 345 or a second superblock 445 as described with reference to FIGS. 3 and 4) for writing data to. In other examples, the memory device 510 may not include superblocks and thus the memory controller 515 may identify blocks for writing data to in a multi-level mode, a single-level mode, or both. For example, the memory controller 515 may identify a first set of blocks 520 that includes at least a first block, a second block, and a fourth block. Additionally or alternatively, the memory controller 515 may identify a second set of blocks 525 that includes one or more blocks.

At 540, the memory controller 515 may identify the first set of blocks 520 and the second set of blocks 525 for a write operation. In some instances, because the second set of blocks 525 may include one or more bad blocks (e.g., that were identified during a testing operation), the memory controller 515 may identify the first subset of the second set of blocks 530 and the second subset of the second set of blocks 535. The memory controller 515 may identify the second subset of the second set of blocks 535 for a SLC write operation based on the second set of blocks 525 including one or more bad blocks and being associated with a multi-level write operation.

The memory controller 515 may receive a first command 545 (or a first set of commands 545) from the host device 505. In some examples, the first command 545 may indicate an operation (e.g., a write operation) to be performed on the memory device 510 in the multi-level mode. For example, the first command 545 may indicate a multi-plane write command to be performed on the memory device 510 and may be associated with the first set of blocks 520 and the second set of blocks 525. In some examples, the first command 545 may include or be associated with data received from the host device 505. The memory controller 515 may buffer the data (e.g., in a buffer (not shown)) before writing the data to the associated blocks.

At 550, the memory controller 515 may identify one or more cursor values based on receiving the first command 545. As described herein, the memory controller 515 may maintain one or more cursors for writing data to the memory device 510 in a multi-level mode or in a single-level mode. Thus, upon receiving the first command 545 to write data to the memory device 510 in the multi-level mode, the memory controller 515 may determine a value of a cursor (e.g., a first cursor, a multi-level mode cursor) to determine a starting block for the write operation. The value of the cursor may indicate the first set of blocks 520 for writing the data to in the multi-level mode. In some instances, the first block of the first set of blocks 520 may be include in or associated with a first superblock (e.g., a main superblock, a complete superblock).

The memory controller 515 may transmit signaling 555 to the first set of blocks 520 and the second set of blocks 525 based on identifying the value of the first cursor. The signaling 555 may include a command (e.g., a write command) and an address one or more blocks for writing data to. In the case of a multi-plane write command, the signaling 555 may include addresses of blocks that are included in multiple planes and included in the first set of blocks 520 and the second set of blocks 525. The signaling 555 may initiate a write operation on the first set of blocks in the multi-level mode, the first subset of the second set of blocks 530 in the multi-level mode, and the second subset of the second set of blocks 535 in the single-level mode.

Signaling 555 may be returned to the memory controller 515 to indicate that the write operation was performed on a respective block (or blocks). For example, the signaling 555 may indicate that the write operation was performed on the first set of blocks 520, the first subset of the second set of blocks 530, and the second subset of the second set of blocks 535. In some instances, the memory controller 515 may transmit signaling 560 to the host device 505 in response to the operation(s) associated with the first command(s) 545 being complete.

The memory controller 515 may receive a second command 565 (or a second set of commands 565) from the host device 505. In some examples, the second command 565 may indicate an operation (e.g., a write operation) to be performed on the memory device 510 in the single-level mode. For example, the second command 565 may indicate a multi-plane write command to be performed on the memory device 510. In some examples, the first command 545 may include or be associated with data received from the host device 505. The memory controller 515 may buffer the data (e.g., in a buffer (not shown)) before writing the data to the associated blocks.

At 570, the memory controller 515 may identify one or more cursor values based on receiving the second command 565. As described herein, the memory controller 515 may maintain one or more cursors for writing data to the memory device 510 in a multi-level mode or in a single-level mode. Thus, upon receiving the second command 565 to write data to the memory device 510 in the single-level mode, the memory controller 515 may determine a value of a cursor (e.g., a second cursor, a SLC cursor) to determine a starting block for the write operation. The value of the cursor may indicate or identify a first block of the first set of blocks 520 for writing the data to in the single-level mode. In some instances, the first block of the first set of blocks 520 may be include in or associated with a first superblock (e.g., a main superblock, a complete superblock).

The memory controller 515 may transmit signaling 575 to the first set of blocks 520 based on identifying the value of the second cursor. The signaling 575 may include a command (e.g., a write command) and an address one or more blocks for writing data to. In the case of a multi-plane write command, the signaling 575 may include addresses of blocks that are included in multiple planes and included in the first set of blocks 520. The signaling 575 may initiate a write operation on the first set of blocks 520 in the single-level mode. As described above with reference to FIG. 4, the memory controller 515 may skip or refrain from writing data to the second set of blocks 525 in the single-level mode.

Signaling 575 may be returned to the memory controller 515 to indicate that the write operation was performed on a respective block (or blocks). For example, the signaling 575 may indicate that the write operation was performed on the first set of blocks 520. In some instances, the memory controller 515 may transmit signaling 560 to the host device 505 in response to the operation(s) associated with the second command(s) 565 being complete. Thus, the memory device 510 may utilize the first set of blocks 520 while operating in a single-level mode, while maintaining one or more blocks of a second set of blocks 525 for use when operating in a multi-level mode, which may improve the overall performance of the memory device 510.

Figure 6:
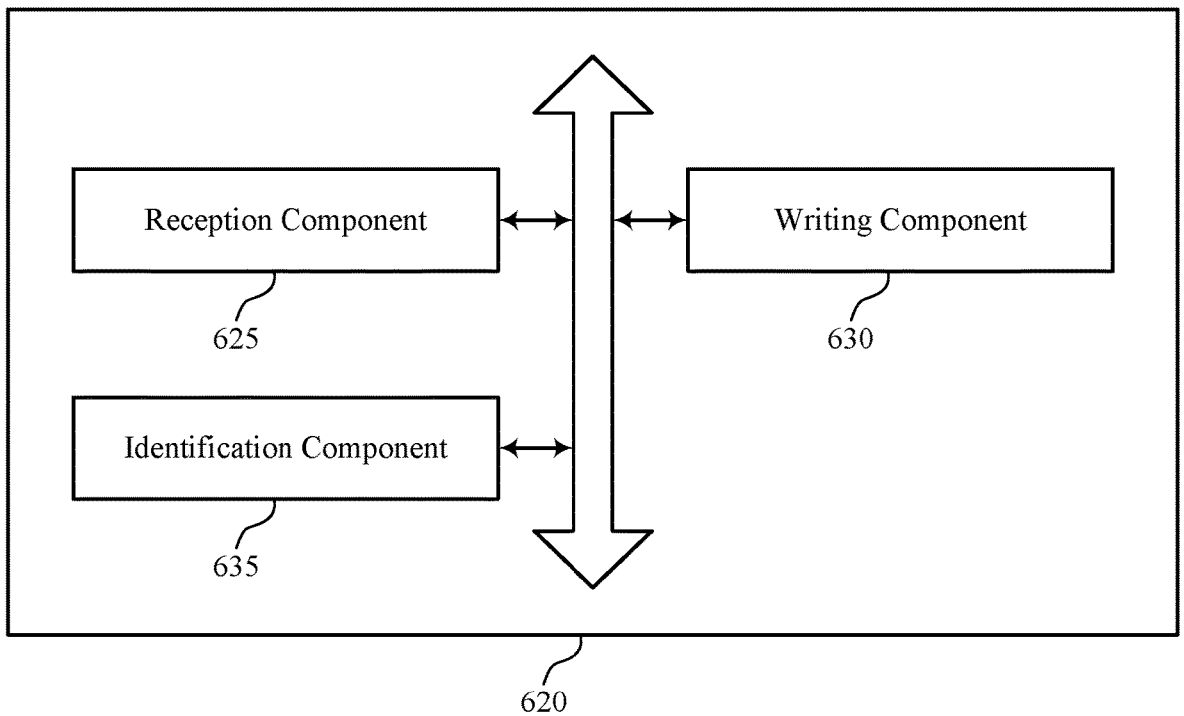
FIG. 6 shows a block diagram of a managed memory system controller that supports adaptive block mapping in accordance with examples as disclosed herein.

FIG. 6 shows a block diagram 600 of a managed memory system controller 620 that supports adaptive block mapping in accordance with examples as disclosed herein. The managed memory system controller 620 may be an example of aspects of a managed memory system controller as described with reference to FIGS. 1 through 5. The managed memory system controller 620, or various components thereof, may be an example of means for performing various aspects of adaptive block mapping as described herein. For example, the managed memory system controller 620 may include a reception component 625, a writing component 630, an identification component 635, or any combination thereof. Each of these components may communicate, directly or indirectly, with one another (e.g., via one or more buses).

The reception component 625 may be configured as or otherwise support a means for receiving, from a host device, a first command for writing first data to a memory including a plurality of planes that each include a plurality of blocks in a first mode, where each block of the plurality of blocks includes a plurality of non-volatile memory cells. In some examples, the reception component 625 may be configured as or otherwise support a means for receiving, from the host device, a second command for writing second data to the memory in the second mode, where upon receiving the second command a second cursor value associated with the second mode indicates the first set of blocks.

The writing component 630 may be configured as or otherwise support a means for writing, in the first mode, a first portion of the first data to at least a first block of a first set of blocks of the memory based at least in part on receiving the first command from the host device and a first cursor value associated with the first mode indicating the first set of blocks. In some examples, the writing component 630 may be configured as or otherwise support a means for writing, in a second mode, a second portion of the first data to at least a second block of the first set of blocks based at least in part on receiving the first command from the host device.

In some examples, the writing component 630 may be configured as or otherwise support a means for writing, in the second mode, the second data to one or more blocks of a second set of blocks of the memory based at least in part on receiving the second command from the host device and the second cursor value associated with the second mode indicating the first set of blocks. In some examples, the writing component 630 may be configured as or otherwise support a means for refraining from writing the second data to blocks of the first set of blocks based at least in part on receiving the second command for writing the second data to the memory and the second cursor value associated with the second mode indicating the first set of blocks. In some examples, to support writing the first data in the first mode, the writing component 630 may be configured as or otherwise support a means for writing, in the first mode, a third portion of the first data to at least a fourth block of the third set of blocks prior to writing the first portion of the first data to the at least the first block of the first set of blocks.

In some examples, the identification component 635 may be configured as or otherwise support a means for identifying at least the second block of the first set of blocks of the memory based at least in part on a third block of the memory being defective, where the controller is operable to write the second portion of the first data to at least the second block in the second mode based at least in part on identifying at least the second block of the memory.

In some examples, the second block of the memory is in a different plane of the memory than the third block of the memory. In some examples, the first set of blocks is associated with a third set of blocks when data is written to the memory in the first mode. In some examples, the first set of blocks includes a larger quantity of blocks of the memory than the third set of blocks.

In some examples, the first command includes one or more logical addresses for writing the first data to the first set of blocks in the first mode. In some examples, the first mode includes writing a plurality of bits of data per memory cell. In some examples, the second mode includes writing one bit of data per memory cell.

Figure 7:
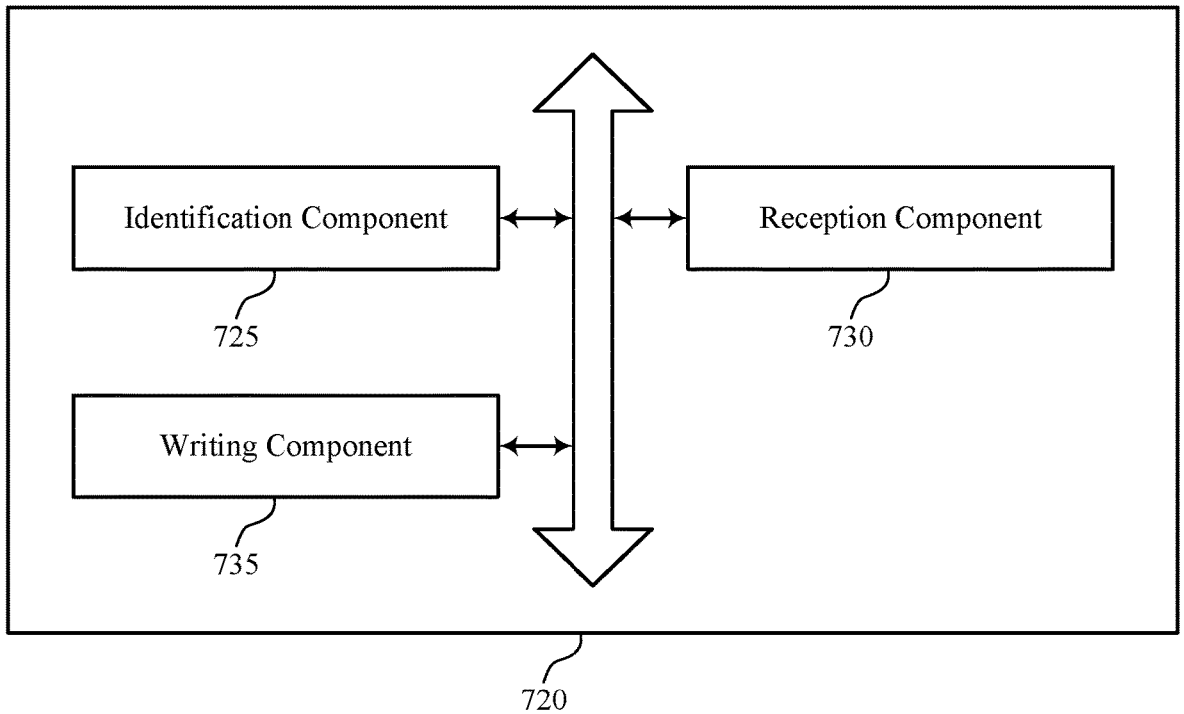
FIG. 7 shows a block diagram of a managed memory system controller that supports adaptive block mapping in accordance with examples as disclosed herein.

FIG. 7 shows a block diagram 700 of a managed memory system controller 720 that supports adaptive block mapping in accordance with examples as disclosed herein. The managed memory system controller 720 may be an example of aspects of a managed memory system controller as described with reference to FIGS. 1 through 5. The managed memory system controller 720, or various components thereof, may be an example of means for performing various aspects of adaptive block mapping as described herein. For example, the managed memory system controller 720 may include an identification component 725, a reception component 730, a writing component 735, or any combination thereof. Each of these components may communicate, directly or indirectly, with one another (e.g., via one or more buses).

The identification component 725 may be configured as or otherwise support a means for identifying a first set of blocks of a memory and a second set of blocks of the memory, where the memory includes a plurality of planes that each include a plurality of blocks, where each block of the plurality of blocks includes a plurality of non-volatile memory cells, and where the second set of blocks is associated with the first set of blocks.

The reception component 730 may be configured as or otherwise support a means for receiving, from a host device, one or more commands for writing first data to the memory in a first mode. In some examples, the reception component 730 may be configured as or otherwise support a means for receiving, from the host device, a second set of one or more commands for writing second data to the memory in the second mode.

The writing component 735 may be configured as or otherwise support a means for writing, in the first mode, a first portion of the first data to the first set of blocks and a second portion of the first data to a first subset of blocks of the second set of blocks based at least in part on receiving the one or more commands from the host device. In some examples, the writing component 735 may be configured as or otherwise support a means for writing, in a second mode, a third portion of the first data to a second subset of blocks of the second set of blocks based at least in part on receiving the one or more commands from the host device.

In some examples, the writing component 735 may be configured as or otherwise support a means for writing, in the second mode, the second data to the first set of blocks based at least in part on receiving the second set of one or more commands from the host device. In some examples, the writing component 735 may be configured as or otherwise support a means for refraining from writing, in the second mode, the second data to the second set of blocks based at least in part on receiving the second set of one or more commands from the host device.

In some examples, a quantity of blocks included in the second set of blocks is greater than a quantity of blocks included in the first set of blocks. In some examples, the first mode includes writing a plurality of bits of data per memory cell. In some examples, the second mode includes writing one bit of data per memory cell. In some examples, a at least one block of the memory is a defective block. In some examples, the third portion of the first data is written to the second subset of blocks of the second set of blocks based at least in part on the at least one block being defective. In some examples, the second subset of blocks of the second set of blocks of the memory are in different planes of the memory than the at least one block. In some examples, each of the first subset of blocks of the second set of blocks is a corresponding block from different planes of the memory.

Figure 8:
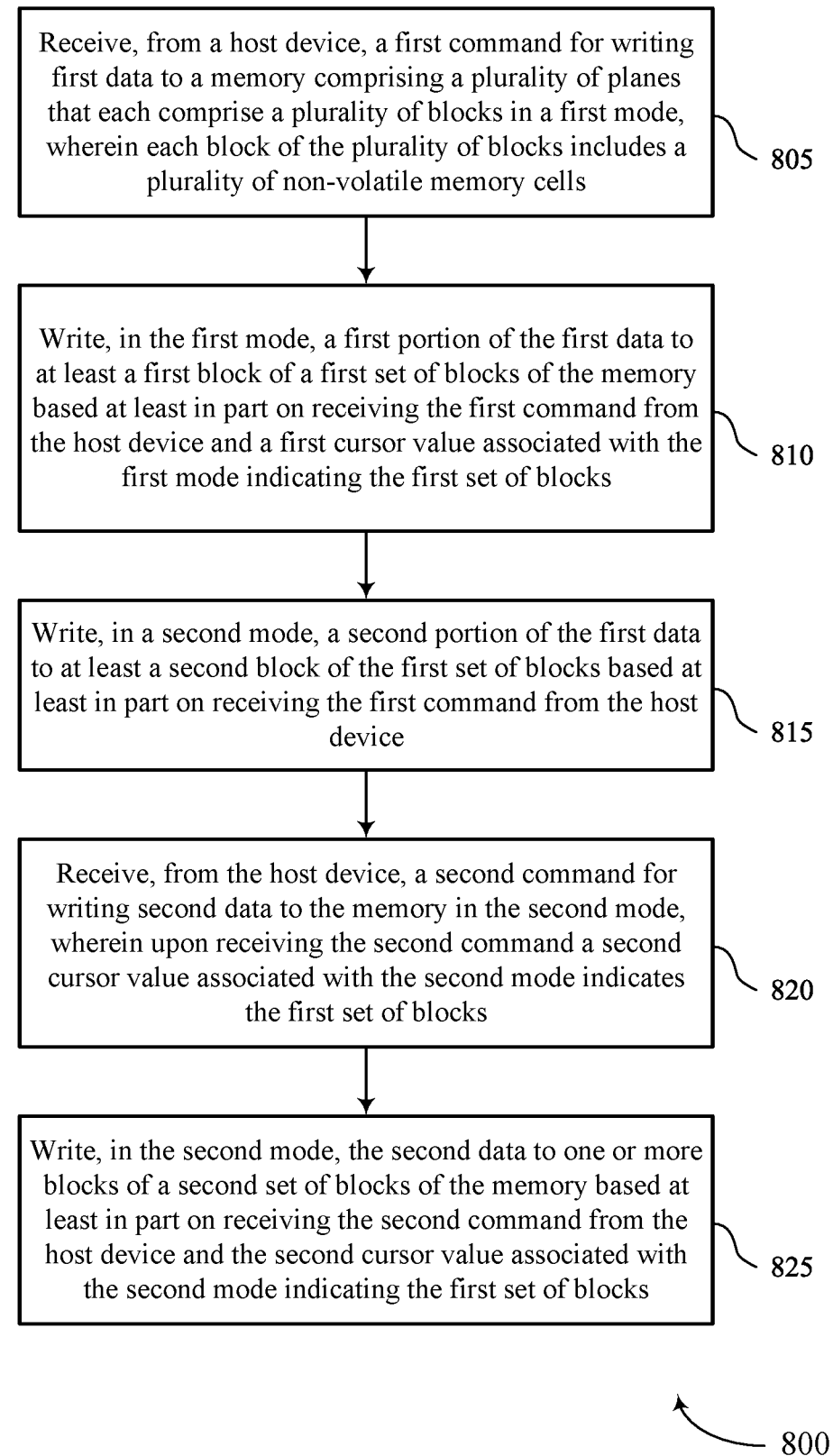
FIGS. 8 and 9 show flowcharts illustrating a method or methods that support adaptive block mapping in accordance with examples as disclosed herein.

FIG. 8 shows a flowchart illustrating a method 800 that supports adaptive block mapping in accordance with examples as disclosed herein. The operations of method 800 may be implemented by a managed memory system controller or its components as described herein. For example, the operations of method 800 may be performed by a managed memory system controller as described with reference to FIGS. 1 through 6. In some examples, a managed memory system controller may execute a set of instructions to control the functional elements of the device to perform the described functions. Additionally or alternatively, the managed memory system controller may perform aspects of the described functions using special-purpose hardware.

At 805, the method may include receiving, from a host device, a first command for writing first data to a memory including a plurality of planes that each include a plurality of blocks in a first mode, where each block of the plurality of blocks includes a plurality of non-volatile memory cells. The operations of 805 may be performed in accordance with examples as disclosed herein. In some examples, aspects of the operations of 805 may be performed by a reception component 625 as described with reference to FIG. 6.

At 810, the method may include writing, in the first mode, a first portion of the first data to at least a first block of a first set of blocks of the memory based at least in part on receiving the first command from the host device and a first cursor value associated with the first mode indicating the first set of blocks. The operations of 810 may be performed in accordance with examples as disclosed herein. In some examples, aspects of the operations of 810 may be performed by a writing component 630 as described with reference to FIG. 6.

At 815, the method may include writing, in a second mode, a second portion of the first data to at least a second block of the first set of blocks based at least in part on receiving the first command from the host device. The operations of 815 may be performed in accordance with examples as disclosed herein. In some examples, aspects of the operations of 815 may be performed by a writing component 630 as described with reference to FIG. 6.

At 820, the method may include receiving, from the host device, a second command for writing second data to the memory in the second mode, where upon receiving the second command a second cursor value associated with the second mode indicates the first set of blocks. The operations of 820 may be performed in accordance with examples as disclosed herein. In some examples, aspects of the operations of 820 may be performed by a reception component 625 as described with reference to FIG. 6.

At 825, the method may include writing, in the second mode, the second data to one or more blocks of a second set of blocks of the memory based at least in part on receiving the second command from the host device and the second cursor value associated with the second mode indicating the first set of blocks. The operations of 825 may be performed in accordance with examples as disclosed herein. In some examples, aspects of the operations of 825 may be performed by a writing component 630 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, from a host device, a first command for writing first data to a memory including a plurality of planes that each include a plurality of blocks in a first mode, where each block of the plurality of blocks includes a plurality of non-volatile memory cells, writing, in the first mode, a first portion of the first data to at least a first block of a first set of blocks of the memory based at least in part on receiving the first command from the host device and a first cursor value associated with the first mode indicating the first set of blocks, writing, in a second mode, a second portion of the first data to at least a second block of the first set of blocks based at least in part on receiving the first command from the host device, receiving, from the host device, a second command for writing second data to the memory in the second mode, where upon receiving the second command a second cursor value associated with the second mode indicates the first set of blocks, and writing, in the second mode, the second data to one or more blocks of a second set of blocks of the memory based at least in part on receiving the second command from the host device and the second cursor value associated with the second mode indicating the first set of blocks.

Some examples of the method 800 and the apparatus described herein may further include operations, features, circuitry, logic, means, or instructions for refraining from writing the second data to blocks of the first set of blocks based at least in part on receiving the second command for writing the second data to the memory and the second cursor value associated with the second mode indicating the first set of blocks.

Some examples of the method 800 and the apparatus described herein may further include operations, features, circuitry, logic, means, or instructions for identifying at least the second block of the first set of blocks of the memory based at least in part on a third block of the memory being defective, where the controller may be operable to write the second portion of the first data to at least the second block in the second mode based at least in part on identifying at least the second block of the memory.

In some examples of the method 800 and the apparatus described herein, the second block of the memory may be in a different plane of the memory than the third block of the memory.

In some examples of the method 800 and the apparatus described herein, the first set of blocks may be associated with a third set of blocks when data may be written to the memory in the first mode.

In some examples of the method 800 and the apparatus described herein, the first set of blocks includes a larger quantity of blocks of the memory than the third set of blocks.

In some examples of the method 800 and the apparatus described herein, writing the first data in the first mode may include operations, features, circuitry, logic, means, or instructions for writing, in the first mode, a third portion of the first data to at least a fourth block of the third set of blocks prior to writing the first portion of the first data to the at least the first block of the first set of blocks.

In some examples of the method 800 and the apparatus described herein, the first command includes one or more logical addresses for writing the first data to the first set of blocks in the first mode.

In some examples of the method 800 and the apparatus described herein, the first mode includes writing a plurality of bits of data per memory cell, and the second mode includes writing one bit of data per memory cell.

Figure 9:
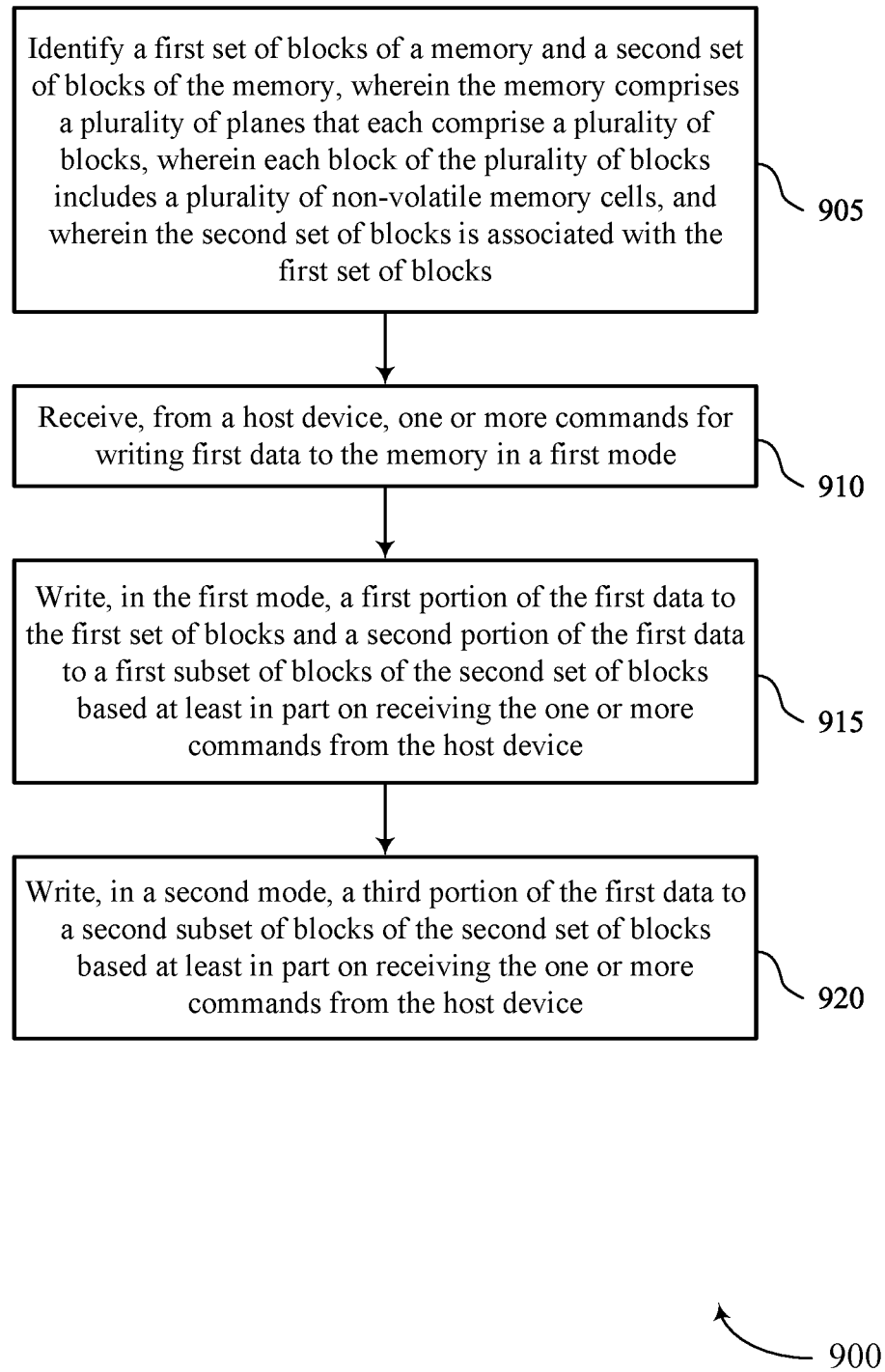

FIG. 9 shows a flowchart illustrating a method 900 that supports adaptive block mapping in accordance with examples as disclosed herein. The operations of method 900 may be implemented by a managed memory system controller or its components as described herein. For example, the operations of method 900 may be performed by a managed memory system controller as described with reference to FIGS. 1 through 5 and 7. In some examples, a managed memory system controller may execute a set of instructions to control the functional elements of the device to perform the described functions. Additionally or alternatively, the managed memory system controller may perform aspects of the described functions using special-purpose hardware.

At 905, the method may include identifying a first set of blocks of a memory and a second set of blocks of the memory, where the memory includes a plurality of planes that each include a plurality of blocks, where each block of the plurality of blocks includes a plurality of non-volatile memory cells, and where the second set of blocks is associated with the first set of blocks. The operations of 905 may be performed in accordance with examples as disclosed herein. In some examples, aspects of the operations of 905 may be performed by an identification component 725 as described with reference to FIG. 7.

At 910, the method may include receiving, from a host device, one or more commands for writing first data to the memory in a first mode. The operations of 910 may be performed in accordance with examples as disclosed herein. In some examples, aspects of the operations of 910 may be performed by a reception component 730 as described with reference to FIG. 7.

At 915, the method may include writing, in the first mode, a first portion of the first data to the first set of blocks and a second portion of the first data to a first subset of blocks of the second set of blocks based at least in part on receiving the one or more commands from the host device. The operations of 915 may be performed in accordance with examples as disclosed herein. In some examples, aspects of the operations of 915 may be performed by a writing component 735 as described with reference to FIG. 7.

At 920, the method may include writing, in a second mode, a third portion of the first data to a second subset of blocks of the second set of blocks based at least in part on receiving the one or more commands from the host device. The operations of 920 may be performed in accordance with examples as disclosed herein. In some examples, aspects of the operations of 920 may be performed by a writing component 735 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for identifying a first set of blocks of a memory and a second set of blocks of the memory, where the memory includes a plurality of planes that each include a plurality of blocks, where each block of the plurality of blocks includes a plurality of non-volatile memory cells, and where the second set of blocks is associated with the first set of blocks, receiving, from a host device, one or more commands for writing first data to the memory in a first mode, writing, in the first mode, a first portion of the first data to the first set of blocks and a second portion of the first data to a first subset of blocks of the second set of blocks based at least in part on receiving the one or more commands from the host device, and writing, in a second mode, a third portion of the first data to a second subset of blocks of the second set of blocks based at least in part on receiving the one or more commands from the host device.

Some examples of the method 900 and the apparatus described herein may further include operations, features, circuitry, logic, means, or instructions for receiving, from the host device, a second set of one or more commands for writing second data to the memory in the second mode and writing, in the second mode, the second data to the first set of blocks based at least in part on receiving the second set of one or more commands from the host device.

Some examples of the method 900 and the apparatus described herein may further include operations, features, circuitry, logic, means, or instructions for refraining from writing, in the second mode, the second data to the second set of blocks based at least in part on receiving the second set of one or more commands from the host device.

In some examples of the method 900 and the apparatus described herein, a quantity of blocks included in the second set of blocks may be greater than a quantity of blocks included in the first set of blocks.

In some examples of the method 900 and the apparatus described herein, the first mode includes writing a plurality of bits of data per memory cell, and the second mode includes writing one bit of data per memory cell.

In some examples of the method 900 and the apparatus described herein, a at least one block of the memory may be a defective block, and the third portion of the first data may be written to the second subset of blocks of the second set of blocks based at least in part on the at least one block being defective.

In some examples of the method 900 and the apparatus described herein, the second subset of blocks of the second set of blocks of the memory may be in different planes of the memory than the at least one block.

In some examples of the method 900 and the apparatus described herein, each of the first subset of blocks of the second set of blocks may be a corresponding block from different planes of the memory.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory comprising a plurality of planes that each comprise a plurality of blocks, wherein each block of the plurality of blocks includes a plurality of non-volatile memory cells; and
   a controller coupled with the memory and operable to:
   identify a first set of blocks of the memory and a second set of blocks of the memory, wherein the second set of blocks is associated with the first set of blocks;
   receive, from a host device, one or more commands for writing data to the memory in a first mode;
   write, in the first mode, a first portion of the data to blocks of the first set of blocks and a second portion of the data to a first subset of blocks of the second set of blocks based at least in part on receiving the one or more commands from the host device, wherein the first mode comprises writing a plurality of bits of data per memory cell; and
   write, in a second mode, a third portion of the data to a second subset of blocks of the second set of blocks based at least in part on receiving the one or more commands from the host device, wherein the second mode comprises writing one bit of data per memory cell.

2. The apparatus of claim 1, wherein the controller is operable to:
   receive, from the host device, a second set of one or more commands for writing second data to the memory in the second mode; and
   write, in the second mode, the second data to the blocks of the first set of blocks based at least in part on receiving the second set of one or more commands from the host device.

3. The apparatus of claim 2, wherein the controller is operable to:
   refrain from writing, in the second mode, the second data to the second set of blocks based at least in part on receiving the second set of one or more commands from the host device.

4. The apparatus of claim 1, wherein at least one block of the memory is a defective block, wherein the data is written to the second subset of blocks of the second set of blocks of the memory based at least in part on the at least one block being defective.

5. The apparatus of claim 4, wherein the second subset of blocks of the second set of blocks are in different planes of the memory than the at least one block that is defective.

6. The apparatus of claim 1, wherein each of the first subset of blocks of the second set of blocks is a corresponding block from different planes of the memory.

7. An apparatus, comprising:
   a memory comprising a plurality of planes that each comprise a plurality of blocks, wherein each block of the plurality of blocks includes a plurality of non-volatile memory cells; and
   a controller coupled with the memory and operable to:
   identify a first set of blocks of the memory and a second set of blocks of the memory, wherein the second set of blocks is associated with the first set of blocks;
   receive, from a host device, one or more commands for writing data to the memory in a first mode;
   write, in the first mode, a first portion of the data to blocks of the first set of blocks and a second portion of the data to a first subset of blocks of the second set of blocks based at least in part on receiving the one or more commands from the host device; and
   write, in a second mode, a third portion of the data to a second subset of blocks of the second set of blocks based at least in part on receiving the one or more commands from the host device, wherein a quantity of blocks included in the first subset of blocks of the second set of blocks and the second subset of blocks of the second set of blocks of the memory is greater than a quantity of blocks included in the first set of blocks.

8. An apparatus, comprising:
   a memory comprising a plurality of planes that each comprise a plurality of blocks, wherein each block of the plurality of blocks includes a plurality of non-volatile memory cells; and
   a controller coupled with the memory and operable to:
   receive, from a host device, a first command for writing first data to the memory in a first mode;
   write, in the first mode, a first portion of the first data to at least a first block of a first set of blocks of the memory based at least in part on receiving the first command from the host device and a first cursor value associated with the first mode indicating the first set of blocks, wherein the first mode comprises writing a plurality of bits of data per memory cell;
   write, in a second mode, a second portion of the first data to at least a second block of the first set of blocks based at least in part on receiving the first command from the host device, wherein the second mode comprises writing one bit of data per memory cell;
   receive, from the host device, a second command for writing second data to the memory in the second mode, wherein upon receiving the second command a second cursor value associated with the second mode indicates the first set of blocks; and
   write, in the second mode, the second data to one or more blocks of a second set of blocks of the memory based at least in part on receiving the second command from the host device and the second cursor value associated with the second mode indicating the first set of blocks.

9. The apparatus of claim 8, wherein the controller is operable to:
refrain from writing the second data to blocks of the first set of blocks based at least in part on receiving the second command for writing the second data to the memory and the second cursor value associated with the second mode indicating the first set of blocks.

10. The apparatus of claim 8, wherein the controller is operable to:
identify at least the second block of the first set of blocks of the memory based at least in part on a third block of the memory being defective, wherein the controller is operable to write the second portion of the first data to at least the second block in the second mode based at least in part on identifying at least the second block of the memory.

11. The apparatus of claim 10, wherein the second block of the memory is in a different plane of the memory than the third block of the memory.

12. The apparatus of claim 8, wherein the first set of blocks is associated with a third set of blocks when data is written to the memory in the first mode.

13. The apparatus of claim 12, wherein the first set of blocks includes a larger quantity of blocks of the memory than the third set of blocks.

14. The apparatus of claim 8, wherein the first command comprises one or more logical addresses for writing the first data to the first set of blocks in the first mode.

15. An apparatus, comprising:
a memory comprising a plurality of planes that each comprise a plurality of blocks, wherein each block of the plurality of blocks includes a plurality of non-volatile memory cells; and
a controller coupled with the memory and operable to:
receive, from a host device, a first command for writing first data to the memory in a first mode;
write, in the first mode, a first portion of the first data to at least a first block of a first set of blocks of the memory based at least in part on receiving the first command from the host device and a first cursor value associated with the first mode indicating the first set of blocks, wherein the first set of blocks is associated with a third set of blocks when data is written to the memory in the first mode, and wherein, to write the first data in the first mode, the controller is operable to write, in the first mode, a third portion of the first data to at least a fourth block of the third set of blocks prior to writing the first portion of the first data to the at least the first block of the first set of blocks;
write, in a second mode, a second portion of the first data to at least a second block of the first set of blocks based at least in part on receiving the first command from the host device;
receive, from the host device, a second command for writing second data to the memory in the second mode, wherein upon receiving the second command a second cursor value associated with the second mode indicates the first set of blocks; and
write, in the second mode, the second data to one or more blocks of a second set of blocks of the memory based at least in part on receiving the second command from the host device and the second cursor value associated with the second mode indicating the first set of blocks.

16. A non-transitory computer-readable medium storing code comprising instructions which, when executed by a processor of a memory device, cause the memory device to:
identify a first set of blocks of a memory and a second set of blocks of the memory, wherein the memory comprises a plurality of planes that each comprise a plurality of blocks, wherein each block of the plurality of blocks includes a plurality of non-volatile memory cells, and wherein the second set of blocks is associated with the first set of blocks;
receive, from a host device, one or more commands for writing first data to the memory in a first mode;
write, in the first mode, a first portion of the first data to the first set of blocks and a second portion of the first data to a first subset of blocks of the second set of blocks based at least in part on receiving the one or more commands from the host device, wherein the first mode comprises writing a plurality of bits of data per memory cell; and
write, in a second mode, a third portion of the first data to a second subset of blocks of the second set of blocks based at least in part on receiving the one or more commands from the host device, wherein the second mode comprises one bit of data per memory cell.

17. The non-transitory computer-readable medium of claim 16, wherein the instructions, when executed by the processor of the memory device, further cause the memory device to:
receive, from the host device, a second set of one or more commands for writing second data to the memory in the second mode; and
write, in the second mode, the second data to the first set of blocks based at least in part on receiving the second set of one or more commands from the host device.

18. The non-transitory computer-readable medium of claim 17, wherein the instructions, when executed by the processor of the memory device, further cause the memory device to:
refrain from writing, in the second mode, the second data to the second set of blocks based at least in part on receiving the second set of one or more commands from the host device.

19. The non-transitory computer-readable medium of claim 16, wherein a at least one block of the memory is a defective block, wherein the third portion of the first data is written to the second subset of blocks of the second set of blocks based at least in part on the at least one block being defective.

20. The non-transitory computer-readable medium of claim 19, wherein the second subset of blocks of the second set of blocks of the memory are in different planes of the memory than the at least one block.

21. The non-transitory computer-readable medium of claim 16, wherein each of the first subset of blocks of the second set of blocks is a corresponding block from different planes of the memory.

22. A non-transitory computer-readable medium storing code comprising instructions which, when executed by a processor of a memory device, cause the memory device to:
identify a first set of blocks of a memory and a second set of blocks of the memory, wherein the memory comprises a plurality of planes that each comprise a plurality of blocks, wherein each block of the plurality of blocks includes a plurality of non-volatile memory cells, and wherein the second set of blocks is associated with the first set of blocks, and wherein a quantity of blocks included in the second set of blocks is greater than a quantity of blocks included in the first set of blocks;

receive, from a host device, one or more commands for writing first data to the memory in a first mode;

write, in the first mode, a first portion of the first data to the first set of blocks and a second portion of the first data to a first subset of blocks of the second set of blocks based at least in part on receiving the one or more commands from the host device; and write, in a second mode, a third portion of the first data to a second subset of blocks of the second set of blocks based at least in part on receiving the one or more commands from the host device.

\* \* \* \* \*